US009621932B2

(12) United States Patent
Pettis et al.

(10) Patent No.: US 9,621,932 B2
(45) Date of Patent: Apr. 11, 2017

(54) ENHANCING LIVE BROADCAST VIEWING THROUGH DISPLAY OF FILTERED INTERNET INFORMATION STREAMS

(75) Inventors: Nathaniel Edward Pettis, San Jose, CA (US); Justin Douglas Moore, San Jose, CA (US)

(73) Assignee: GOOGLE INC., Mountain View, CA (US)

( * ) Notice: Subject to any disclaimer, the term of this patent is extended or adjusted under 35 U.S.C. 154(b) by 65 days.

(21) Appl. No.: 13/407,587

(22) Filed: Feb. 28, 2012

(65) Prior Publication Data

US 2013/0227596 A1   Aug. 29, 2013

(51) Int. Cl.
| | |
|---|---|
| H04H 60/33 | (2008.01) |
| H04N 21/235 | (2011.01) |
| H04N 21/25 | (2011.01) |
| H04N 21/258 | (2011.01) |
| H04N 21/8405 | (2011.01) |
| H04N 21/4722 | (2011.01) |

(52) U.S. Cl.
CPC ....... *H04N 21/2353* (2013.01); *H04N 21/251* (2013.01); *H04N 21/25891* (2013.01); *H04N 21/8405* (2013.01); *H04N 21/4722* (2013.01)

(58) Field of Classification Search
USPC .......................................................... 725/13
See application file for complete search history.

(56) References Cited

U.S. PATENT DOCUMENTS

| | | | |
|---|---|---|---|
| 2002/0092031 A1 | 7/2002 | Dudkiewicz et al. | |
| 2003/0028884 A1* | 2/2003 | Swart | H04N 7/17318 725/51 |
| 2006/0004730 A1* | 1/2006 | Chan | G06F 17/30864 |
| 2006/0179454 A1* | 8/2006 | Shusman | G06Q 30/02 725/45 |
| 2007/0234213 A1 | 10/2007 | Krikorian et al. | |
| 2008/0082922 A1 | 4/2008 | Biniak et al. | |
| 2009/0228921 A1* | 9/2009 | Miki et al. | 725/38 |
| 2010/0162343 A1* | 6/2010 | Roberts | H04N 7/17318 725/136 |

(Continued)

OTHER PUBLICATIONS

Google Inc., International Search Report / Written Opinion, PCT/US2013/028025, May 14, 2013, 9 pgs.

(Continued)

*Primary Examiner* — Nathan Flynn
*Assistant Examiner* — Christine Kurien
(74) *Attorney, Agent, or Firm* — Morgan, Lewis & Bockius LLP

(57) ABSTRACT

A method is described for supplementing a live broadcast. The method is performed on a server system having one or more processors and memory storing one or more programs for execution by the one or more processors to perform the method. The server system receives first keywords related to the live broadcast. The server system then receives a plurality of input streams, wherein each input stream includes a plurality of events. The server system then extracts second keywords from the plurality of events. The server system then determines the relevance of each event in the plurality of events to the live broadcast by correlating the first and second keywords. The server system then transmits the relevant events to a client device.

20 Claims, 9 Drawing Sheets

(56) References Cited

U.S. PATENT DOCUMENTS

2010/0299703 A1* 11/2010 Altman .................. H04H 60/04
725/48
2011/0058101 A1* 3/2011 Earley ................. H04L 12/1822
348/461

OTHER PUBLICATIONS

Google Inc., International Preliminary Report on Patentability, PCT/US2013/028025, Sep. 12, 2014, 6 pgs.
Google Inc., Communication pursuant to Article 94(3) EPC, EP 13709019.7, Feb. 25, 2016, 9 pgs.

* cited by examiner

ENHANCING LIVE BROADCAST VIEWING THROUGH DISPLAY OF FILTERED INTERNET INFORMATION STREAMS

TECHNICAL FIELD

The disclosed implementations relate to the field of live broadcast enhancement generally and in particular to displaying events relating to a live broadcast.

BACKGROUND

Information networks, such as the Internet or World Wide Web, allow any user with an electronic device capable of accessing one of these huge information networks to access a variety of information streams. In addition to static information sources, many information streams are available from these information networks. These information streams constantly provide new information on various topics from individual users, websites, and corporations. Some of the information streams available over these information networks contain information related to live broadcasts.

Users, when viewing live broadcasts, may desire to access the latest information related to the live broadcasts. Such information is available on information streams available to them on the information network. However, few users are willing to spend significant time or energy finding and monitoring these information streams themselves, as it would significantly distract from the experience of viewing the live broadcast. Accordingly, a method which would allow a user to easily view relevant information from information streams would significantly enhance the experience of a user viewing a live broadcast.

SUMMARY

In accordance with some implementations a method for supplementing a live broadcast is disclosed. The method is performed at a server system, the server including one or more processors and memory, the one or more processors being configured to execute programs stored in the memory. The server receives a plurality of first keywords related to a live broadcast. The server then receives a plurality of input streams, each input stream including a plurality of events. The server extracts second keywords from the plurality of events. The server then determines the relevance of each event in the plurality of events to the live broadcast by correlating the first and second keywords. The server then transmits the relevant evens to a client device for display.

In accordance with some implementations, a server system for supplementing a live broadcast is disclosed. The server system includes one or more processors; and memory storing one or more programs to be executed by the one or more processors. The one or more programs include a keyword generation module configured to determine keywords associated with the live TV content. The server system further includes a collection module configured to receive one or more streams of live events, each input stream including a plurality of events, and extract keywords from each of the live events. The server system further includes a correlation module configured to generate a correlation matrix from the standard live events and the keywords, the correlation matrix showing correlation between pairs of the keywords and the text from the live events. The server system further includes a transmission module for transmitting the relevant events to a client device.

In accordance with some implementations, a non-transitory computer readable storage medium storing one or more programs configured for execution by a computer is disclosed. The one or more programs include instructions, which when executed by a portable electronic device with a touch screen display, cause the device to receive first keywords related to a live broadcast, receive a plurality of input streams, each input stream including a plurality of events, extract second keywords from the plurality of events, determine the relevance of each event in the plurality of events to the live broadcast by correlating the first and second keywords, and transmit the relevant events to a client device.

BRIEF DESCRIPTION OF THE DRAWINGS

Like reference numerals refer to corresponding parts throughout the drawings.

DESCRIPTION OF IMPLEMENTATIONS

Figure 1:
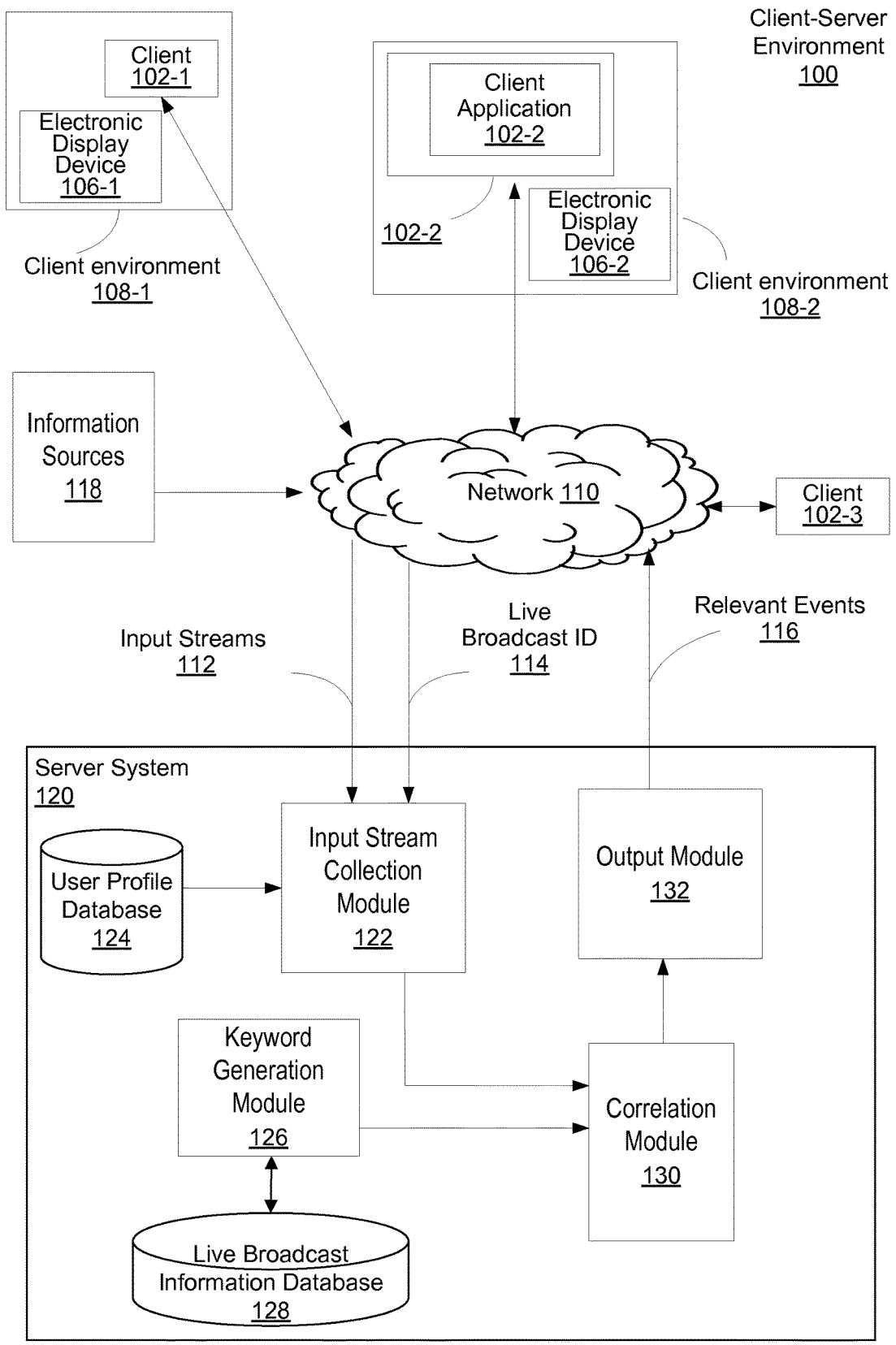
FIG. 1 is a block diagram illustrating a computer network that includes a server system.

In some implementations, a live broadcast is displayed on a television or other electronic display device in a client environment. While the live broadcast is being displayed, the client device sends information identifying the live broadcast being displayed in the client environment to the server system. A live broadcast can include any live media which is broadcast either wirelessly or over a wired medium. For example, a live broadcast may be a television program, a radio show, or an internet broadcast of an event. The server uses the identifying information to collect information streams relevant to the live broadcast, filter them for the most relevant events, and output the relevant events for display at the client system. For example, if a user is viewing a college football game, the server system aggregates information streams related to college football. From the multitude of sports related information streams available via the Internet, the server system generates relevance scores to identify the streams related to the specific game being displayed in the client environment. Once the most relevant events are determined they are transmitted to a client device to be displayed. In some implementations the relevant events are displayed with the live broadcast, in a sidebar, a popup, an overlay, or any other unobtrusive location, or on a second screen device.

In some implementations, the streams aggregated by the servers system are determined by the server system, based on relevance analysis. In some implementations, the server accesses information in a user profile to determine information streams to which the user of a client system is subscribed. In some implementations, the information sources aggregated by the server system are chosen by the producer or broadcaster of the live broadcast. In yet other implementations, the server system uses a combination of all these methods to determine the most relevant streams to aggregate. For example, if a user was watching a college football game between Stanford and Virginia Tech, the server system might collect information streams related to college football. Information streams may include websites like www.espn.com or www.cbssports.com, social media streams from college football related personalities, internet message boards related to college football and Stanford and Virginia Tech. The server system collects information streams to which the user is already subscribed (such as the twitter feeds of their friends, message boards at which they have accounts, RSS feeds to which they are subscribed) and supplements with information streams determined by the broadcaster or producer of the live broadcast event (such as the RSS feed from the website of the broadcast, social media streams of the commentators and sideline reporters). These streams are aggregated and analyzed for relevance. The most relevant streams are transmitted to a client system for display.

In accordance with some implementations, users are able to indicate specific input streams that are always displayed in conjunction with the live broadcast without being subject to relevance analysis. In this way, a user watching a live broadcast can ensure that all social media events posted from friends who are also watching the live broadcast will be displayed in conjunction with the live broadcast. This allows multiple users watching the same live broadcast to communicate directly with each other through their personal social media streams or other means without having to be distracted from the live broadcast.

FIG. 1 is a block diagram illustrating a client-server environment 100 that includes a server system 120, according to some implementations. The client-server environment 100 includes one or more client systems (also referred to herein as electronic devices) 102, one or more client environments 108 and a query-server system 120. The client-server environment 100 further includes a plurality of information sources 116. One or more communications networks 110 interconnect these components. The communications networks 110 may be any of a variety of networks, including local area networks (LAN), wide area networks (WAN), wireless networks, wired networks, the Internet, or a combination of such networks.

The client environment 108 includes a client system 102 and an electronic display device 106 according to some implementations. The client system 102 includes a client application 104, which is executed by the client system, for sending a query to the query server system 120. In some implementations, the client application 104 is selected from the set consisting of a search application, a search engine plug-in for a browser application, and a search engine extension for a browser application. The electronic display device 106 is any electronic device enabled to display a broadcast, including a television, a personal computer, a laptop, or any other personal electronic device with a display.

The client system 102 sends the broadcast ID of the live broadcast being displayed in the client environment 108 to the server system 120. The client system 102 also receives relevant events 118 from the server system 120. The client system 102 may be any computer or other electronic device that is capable of communicating with the query server system 120. Examples include, without limitation, desktop and notebook computers, mainframe computers, server computers, mobile devices such as mobile phones, smart phones, and personal digital assistants, network terminals, and set-top boxes.

According to some implementations, the information sources 118 include any information source accessible over the information network 110. In some implementations, the information sources include any websites, RSS feeds, twitter feeds, internet message board postings, video stream sites, email feeds, and social network updates or notifications.

According to some implementations, the server system 120 includes an input stream collection module 122, a user profile database 124, a keyword generation module 126, a live broadcast information database 128, a correlation module 130, and an output module 132. The input stream collection module 122 receives input streams 122 from various information sources 116 from the information network 110. In some implementations, the input streams 112 collected from the information network 110 are determined by the information stored in the user profile database 124. In some implementations the information stored in the user profile database 124 includes a list of information sources to which the user of the client system is subscribed. In some implementations, the user profile database 124 includes a list of user interests which the input stream collection module uses to determine which input streams to collect. In accordance with some implementations the input stream collection module 122 standardizes the information received from the various input streams by extracting a plurality of events from the streams and, for each event in the plurality of events, analyzing the text of the event to extracting keywords from the plurality of events.

In accordance with some implementations the keyword generation module receives information relevant to the live broadcast being displayed in the client environment 108 from the live broadcast information database 128 or from metadata transmitted with the live broadcast. The keyword generation module 126 then uses this information to generate a first set of keywords associated with the live broadcast displayed in the client environment 108. For example, if the keyword generation module receives information about a college football game from the live broadcast information database 128 or from metadata transmitted with the college football game, the keyword generation module would generate a list of keywords that include the names of the teams involved, a list of players and coaches, a list of football related terminology (touchdown, football, running back, quarterback, sack, blitz, etc), the names of the commentators, and any other terms related to the specific football game.

In accordance with some implementations, the correlation module 130 receives the first set of keywords from the keyword generation module 126 and the stream of standardized events from the input stream collection module 122. Then the correlation module 130 generates a correlation score between each event from the stream of standardized events and the first set of keywords. In some implementations, the correlation score is generated by building a correlation matrix from the first set of keywords and the second set of keywords associated with each standardized event. A relevance score is generated based on the correlation score and a variety of other factors, such as the information stream that is source of the standardized event and time stamp associated with the event. Each event is then filtered based on its associated relevance score and on a minimum relevance threshold score. All events with a relevance score exceeding the minimum relevance score threshold are considered relevant events 116. The relevant events 116 are then passed to the output module 130. The output module 130 then passes each relevant event 116 back to the client system 102 with which it is associated.

In accordance with some implementations, the one or more relevant events are received by the client environment 108 and are then displayed in the client environment 108. In accordance with some implementations, the one more relevant events are displayed on the electronic display device 106 either overlaid on the portion of the display which is displaying the live broadcast or, alternatively, on a portion of the display that is not currently displaying the live broadcast. For example, the one or more relevant events 116 may be displayed on a sidebar on the display screen or on a scroll bar below the section of the display screen which is currently displaying the live broadcast. In another implementation the relevant events may be presented by an audio speaker, or any other means used to communicate information to a user. The user may interact with the relevant events in a variety of ways. For example, the user may interact with the displayed events via any number of input devices, including a mouse, a keyboard, a touch-sensitive display, a voice enabled control system, etc. In another implementation the relevant events may be displayed on an electronic device which is not also displaying the live broadcast. For example, the live broadcast may displayed on a television and the relevant events are shown on the display on a different electronic device, such as a personal computer, a smart phone, or any electronic device capable of displaying text.

Figure 2:
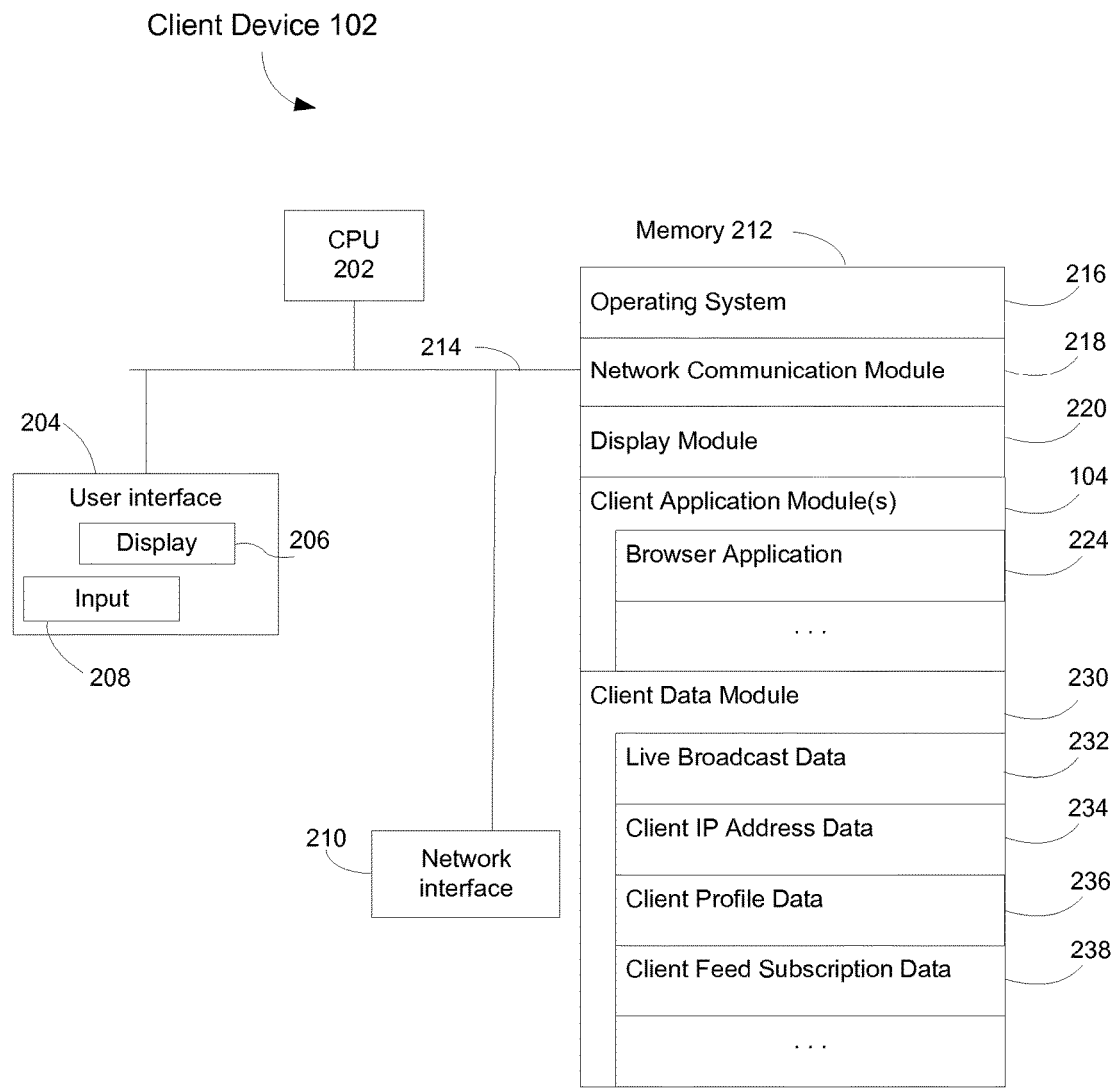
FIG. 2 is a block diagram illustrating a client system, in accordance with some implementations.

FIG. 2 is a block diagram illustrating a client system 102 in accordance with one implementation. The client system 102 typically includes one or more processing units (CPU's) 202, one or more network interfaces 210, memory 212, and one or more communication buses 214 for interconnecting these components. The client system 102 includes a user interface 204. The user interface 204 includes a display device 206 and optionally includes an input means such as a keyboard, mouse, a touch sensitive display, or other input buttons 208. Optionally, the display device 206 includes an audio device or other information delivery device. Furthermore, some client systems use a microphone and voice recognition to supplement or replace the keyboard.

Figure 3:
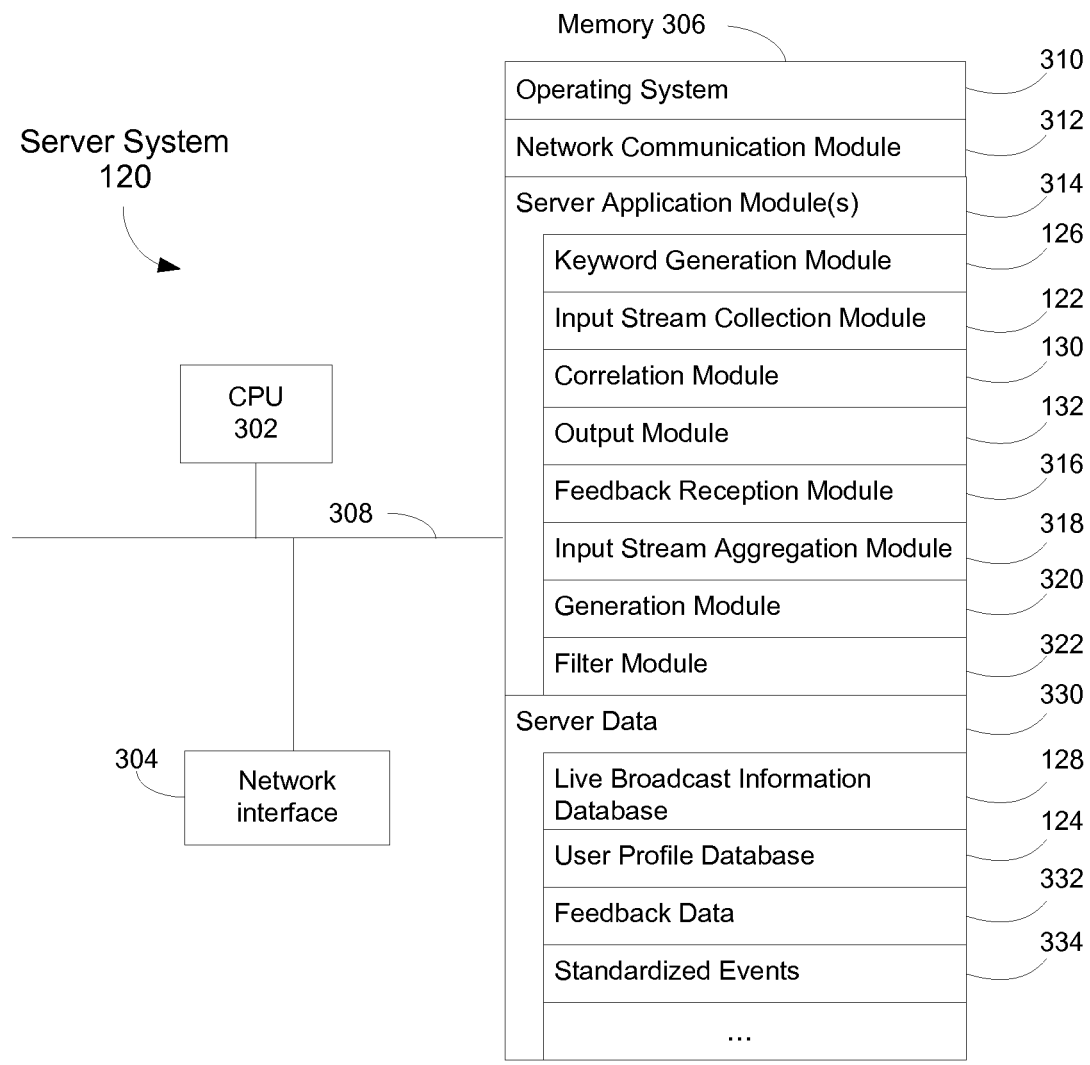
FIG. 3 is a block diagram illustrating a server system, in accordance with some implementations.

Memory 212 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 212 may optionally include one or more storage devices remotely located from the CPU(s) 202. Memory 212, or alternately the non-volatile memory device(s) within memory 212, includes a non-transitory computer readable storage medium. In some implementations, memory 212 or the computer readable storage medium of memory 212 stores the following programs, modules and data structures, or a subset thereof:

- an operating system 216 that includes procedures for handling various basic system services and for performing hardware dependent tasks;
- a network communication module 218 that is used for connecting the client system 102 to other computers via the one or more communication network interfaces 210 (wired or wireless) and one or more communication networks, such as the Internet, other wide area networks, local area networks, metropolitan area networks, and so on;
- a display module 220 for enabling the information generated by the operating system 216 and client applications 230 to be presented visually on the display 206;
- one or more client application modules 104 for handling various aspects of interacting with the query processing 120, including but not limited to: a browser application 224 for sending queries to and receiving results from the server system (FIG. 1, 120);
- a client data module 230, for storing data relevant to the clients, including but not limited to live broadcast data 232, client IP address data 234, client profile data 236, and client feed subscription data 238;

FIG. 3 is a block diagrams illustrating a query server system. The query server system 120 typically includes one or more processing units (CPU's) 302, one or more network or other communications interfaces 304, memory 306, and one or more communication buses 308 for interconnecting these components. Memory 306 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 306 may optionally include one or more storage devices remotely located from the CPU(s) 302. Memory 306, or alternately the non-volatile memory device(s) within memory 306, includes a non-transitory computer readable storage medium. In some implementations, memory 306 or the computer readable storage medium of memory 306 stores the following programs, modules and data structures, or a subset thereof:

- an operating system 310 that includes procedures for handling various basic system services and for performing hardware dependent tasks;
- a network communication module 312 that is used for connecting the server system 120 to other computers via the one or more communication network interfaces 304 (wired or wireless) and one or more communication networks, such as the Internet, other wide area networks, local area networks, metropolitan area networks, and so on;
- one or more server application modules 314 for performing the services offered by the query server system, including but not limited to:
  - a keyword generation module 126 for receiving information about a live broadcast being displayed in a client environment (FIG. 1, 108) and analyzing that information to determine a first set of keywords related to the live broadcast;
  - an input stream collection module 122 for collecting information streams from the information network (FIG. 1, 110), the input stream collection module 122 uses information in the user profile database 124 as well as information from the live broadcast database (FIG. 1, 128) to determine which input streams to collect, the input stream collection module 122 then aggregates the various streams into a single stream of events, and standardizing the format of the plurality of events before sending the standardized events to the correlation module 130;

a correlation module 130 for correlating the stream of standardized events received from the input stream collection module 122 with the first set of keywords associated with the live broadcast being displayed in a client environment (FIG. 1, 108) to generate a correlation score; use that correlation score to generate a relevance score based on the correlation score and filtering each event based on the minimum relevance score;

an output module 132 for receiving events from the correlation module 130 which surpass the minimum relevance score and are therefore determined to be relevant events and sending the determined relevant events (FIG. 1, 116) to the client environment (FIG. 1, 108) for display;

a feedback reception module 316 for receiving feedback from the user of a client system 102; and an event aggregation module 318 for aggregating the input streams collected by the input stream collection module 122 into a single stream of events;

a generation module 320 for generating a series of standardized events from the aggregated event stream;

a filter module 322 for filtering standardized events based on the relevance score and the minimum correlation threshold; wherein events with a relevance score above the minimum relevance threshold are designated as relevant events (FIG. 1, 116) and are sent to the output module 132;

server data 330, holding data related to the server system 120, including but not limited to:

a live broadcast information database 128 including information about live broadcasts, organized by live broadcast ID, including information about the type of broadcast (for example a sports broadcast), the contents of the live broadcast, time, channel, title, cast, and genre;

a user profile database 124 including information about the user of the client system (FIG. 1, 102) including interests, subscribed information feeds, location, previously submitted feedback data, a friends list (or other list such as a favorites list, wherein the list includes a list of information feeds which are automatically displayed without being subject to relevance analysis), and preferred minimum correlation threshold;

feedback data 332 including feedback received from users of a client system (FIG. 1, 102) indicating the users response to a displayed relevant event;

standardized events 334 which are generated from the aggregated information streams.

Figure 4A:
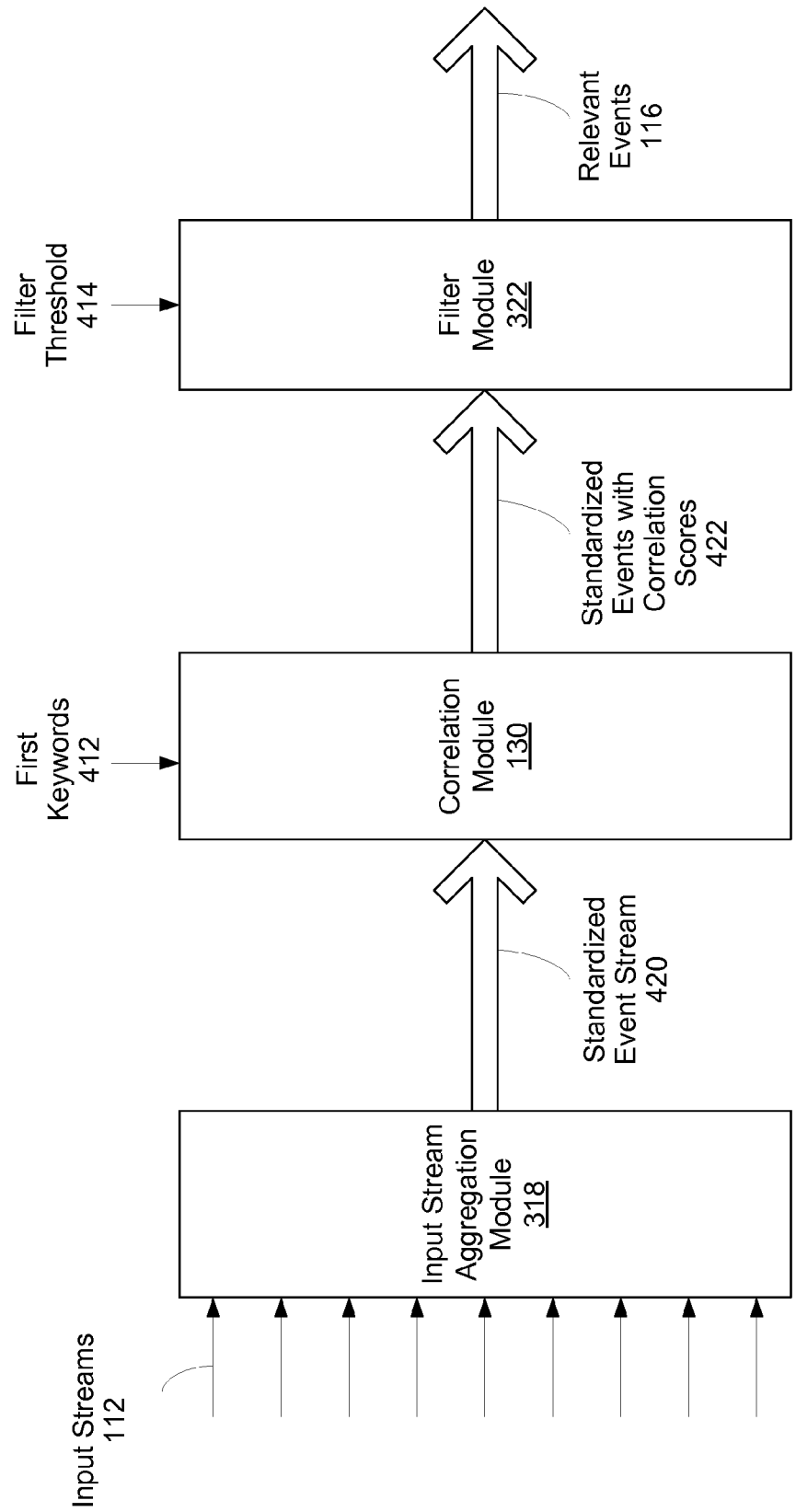
FIG. 4A is a flow diagram illustrating the process of aggregating a plurality of input streams, correlating those streams with keywords and filtering those streams based on the relevance scores in accordance with some implementations.

FIG. 4A is a flow diagram illustrating the process of aggregating a plurality of input streams, correlating those streams with keywords, generating a relevance score based on the correlation score, and filtering those streams based on the relevance scores in accordance with some implementations. Initially, input streams 112 are collected by the input stream collection module (FIG. 1, 122). The input streams 112 include a plurality of information feeds available on an information network (FIG. 1, 110). For example, these input streams may include websites, RSS feeds, twitter feeds, internet message board postings, and social network updates, or any other information stream available over the information network (FIG. 1, 110). In some implementations the server system (FIG. 1, 120) only collects a subset of all input streams 112 available over the information network (FIG. 1, 110) for a given live broadcast. In accordance with some implementations the specific input streams 112 collected by the server system (FIG. 1, 120) are determined by analyzing the subject of the live broadcast and identifying input streams 112 which are sufficiently related to the determined subject.

In some implementations, the input streams 112 are determined by the streams to which the user of the client system (FIG. 102) is subscribed. The collected input streams 112 can also be determined by a combination of user subscribed feeds and relevance determinations. For example, if the live broadcast is a NHL hockey game between the Edmonton Oilers and the Calgary Flames the server system will determine, from all possible input streams, the input streams most correlated to hockey in general and to the two teams involved specifically. This list may include the RSS feeds of sports related websites, the twitter feeds of hockey related personalities, and messages posted on hockey related message boards etc. These streams will be supplemented by any input streams 112 to which the user of the client system (FIG. 1, 102) is subscribed. The user may also indicate, through a "friends list" or "favorites list," a list of information streams that are automatically displayed without being subject to relevance analysis. Allowing a user to select specific information streams which are not subject to relevance analysis enables the user to ensure that all events in the selected streams are displayed. This enables a user to carry on communication with another user through their individual messaging or social media sites without being distracted from the live broadcast they are currently viewing. For example, to users viewing the same live broadcast select each other's twitter feed to be on their respective "friends list" or "favorites list" and thus ensure they will see all the events posted to the twitter feed of the other user. The two users can then interact over their respective twitter feeds without having to go to the twitter website, which may distract from or prevent viewing of the live broadcast.

In some implementations, the input stream aggregation module 318 receives input streams 112 for a particular live broadcast. The input stream aggregation module 318 collects the information from the various input streams 112, separates the steams into discreet events, and aggregates the discreet events into a single event stream 420. In accordance with some implementations, the different input streams 112 differ so widely in source and format that they need to be put into a standardized format before being passed to the correlation module 130. This standardized format is explained more clearly in the discussion of FIG. 4B below. This standardized event stream 420 is then passed onto the correlation module 130.

In accordance with some implementations, the correlation module also receives a set of first keywords 412 related to the live broadcast. In some implementations, the first set of keywords are determined by statistically analyzing broadcast schedules, which also typically contain brief descriptions of the content of live broadcasts, by analyzing data retrieved from the live broadcast information database (FIG. 1, 128), or by analyzing metadata included with the live broadcast. In some implementations, this data is analyzed to identify other words that correlate highly with the live broadcast. In some implementations, the full set of keywords for each broadcast is stored in an easily accessible format for future use. For example, for an American college football game featuring Stanford, the full set of keywords may include the terms "Stanford," "first down," "Blitz," "touchdown," "thrown", and "Luck."

For each event received from the standardized event stream 420 the correlation module uses a correlation matrix to calculate a correlation score between the first set of keywords 412 and the second set of keywords associated with the event. This score is then associated with the event for which it was generated. In some implementations, a relevance score is generated based on a relevance algorithm. In accordance with some implementations the relevance algorithm contains a set of N factors. These factors may be numerical, such as the correlation score and time between notifications, or binary, such as if source is within social graph or if the link is a video. Binary values are simply represented as the numerical values {0.0, 1.0}. There are N weights, each matching with a particular factor. These weights are finite, floating point values. In some implementations the proposed algorithm uses a weighted sum of factors to determine the relevance of the event. For example, let $R=w1*x1+w2*x2+ \ldots +wn*xn$, where R is the relevance score, w1 is the weight assigned to factor 1, and x1 is the value of factor 1.

In accordance with some implementations, each standardized event with its associated relevance score 422 is then passed to the filter module 322. In accordance with some implementations, the filter module 322 also receives a filter threshold value 414. In some implementations this value is initially set by the system (FIG. 1, 120) but then may be adjusted by the user of a client system (FIG. 1, 102). In accordance with some implementations, the filter threshold value 414 represents the minimum relevance score a given standardized event must have to be considered a relevant event 116. In some implementations the filter module 322 compares each event relevance score against the filter threshold value. In accordance with some implementations, events with relevance scores above the filter threshold value 414 are determined to be relevant events 116 and are transmitted to the client system (FIG. 1, 102) for display.

In accordance with some implementations, events with relevance scores below the filter threshold value 414 are not transmitted to a client system (FIG. 1, 102). In some implementations the user of a client system (FIG. 1, 102) sets more than one filter threshold value against which standardized events are compared against, wherein the filter module selects the filter threshold value 414 for each standardized event based on the source of the standardized events. For example, a user may indicate that all twitter communications from a given account should be deemed relevant events and outputted to the client system (FIG. 1, 102) for display. This allows a user who wants to have a more interactive social experience with a particular person or group of people to ensure that all the events from a specific person or group are displayed. In this way a group of friends who are unable to view a live broadcast in the same physical location are still able to communicate with each other while continuing to view the live broadcast.

Figures 4B, 4C:
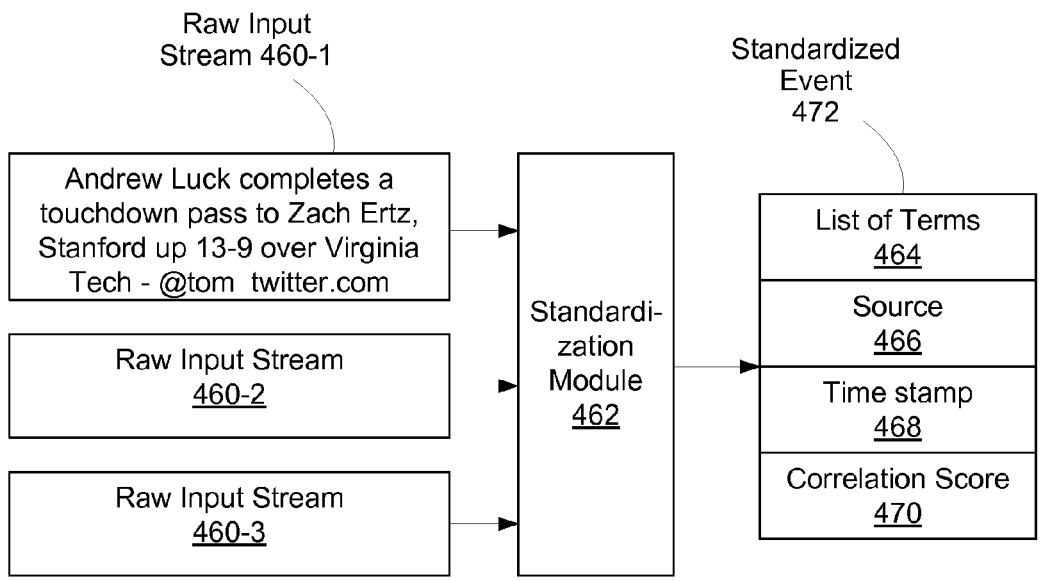
FIG. 4B is a flow diagram illustrating the process of standardizing raw input and generating a standardized event in accordance with some implementations.
FIG. 4C is a block diagram of a correlation matrix used by a correlation module to generate a correlation score for an event in accordance with some implementations.

FIG. 4B is a flow diagram illustrating the process of standardizing raw input and generating a standardized event in accordance with some implementations. The raw input streams 460 are collected and passed to the standardization module 462. The raw input streams 460 contain the text of the events, the name of the stream, the source of the stream, and the time the event was published. The standardization module parses the raw input stream 460, extracting relevant information, and sorting the information into the appropriate fields. Once parsed by the standardization module 462, the standardized events include a list of terms 464 (which includes the second set of keywords), the source of the standardized event 466 (which includes the name of the stream and the name of the website or other information source it was received from), the time stamp 468, and the relevance score 470.

FIG. 4C is a block diagram of a correlation matrix used by a correlation module to generate a relevance score for an event in accordance with some implementations. In accordance with some implementations a correlation matrix 480 is generated for every standardized event (FIG. 4B, 472) received by the correlation module (FIG. 1, 130). The correlation matrix 480 includes a first axis 482 which is populated with the first set of keywords related to the live broadcast. The second axis 484 is populated with the second list of keywords, wherein the second list of keywords is the list of terms (FIG. 4B, 464) from the respective standardized event.

Figure 5:
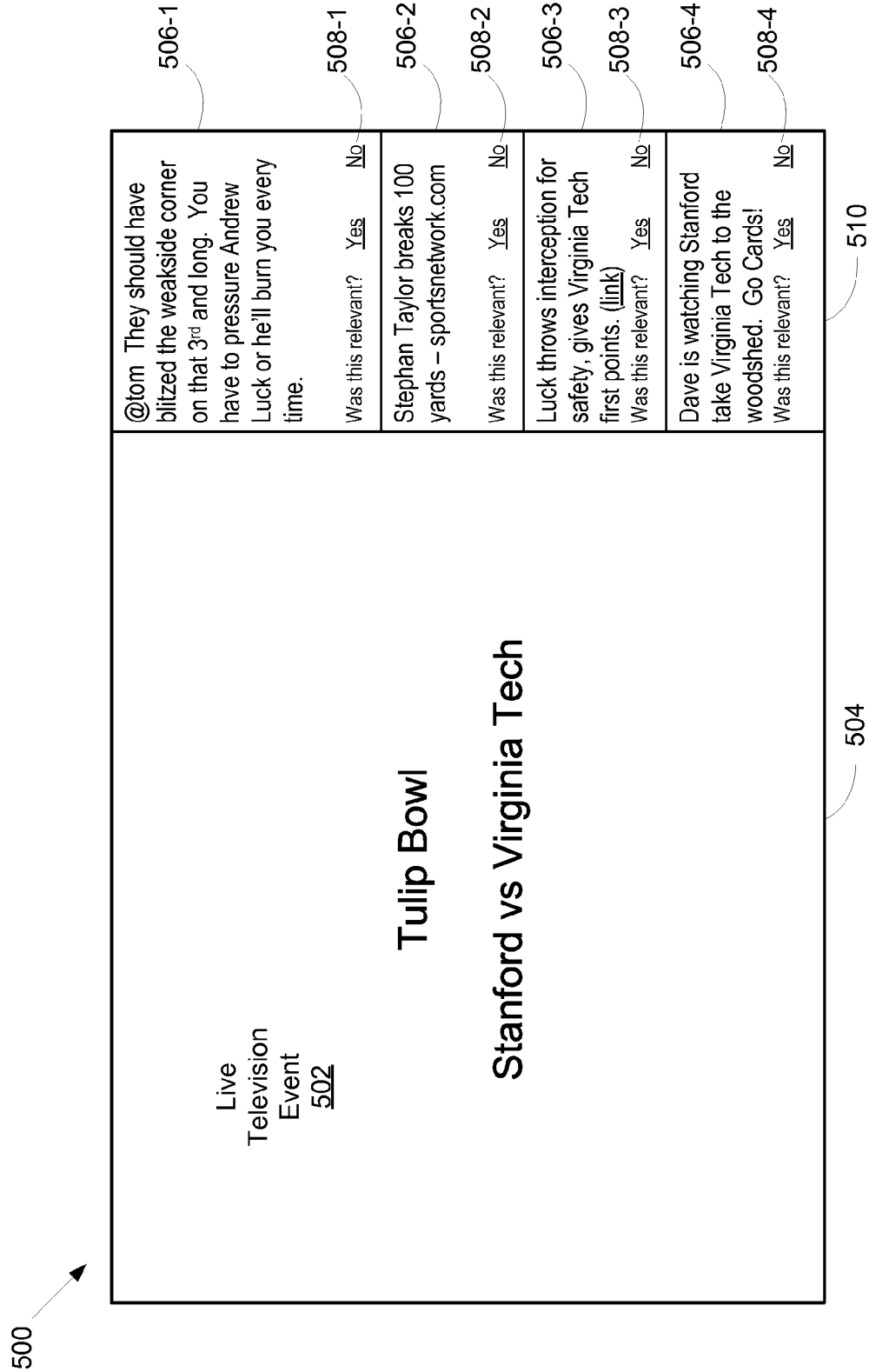
FIG. 5 depicts a user interface in accordance with some implementations.

FIG. 5 depicts a user interface 500 in accordance with some implementations. In this example, the user interface 500 includes a broadcast display area 504 for displaying a live broadcast 502. The user interface 500 further includes a relevant event display area 510 in a sidebar which is displayed proximate to the live broadcast display area 504. This relevant event display area displays relevant events 112 received from the server system (FIG. 1, 120). Each event includes the text of the event 506. In some implementations the event includes the source of event 506-2. In accordance with some implementations each relevant event is displayed as a short snippet of clickable text, which, when clicked on, sends the user further information above the clicked event. Each event also displays a user feedback mechanism 508 that allows a user of the client system (FIG. 1, 102) to indicate whether a particular event was relevant to the live broadcast 502. In this example, the live broadcast is a college football game between Stanford and Virginia Tech. In this example, the relevant events 506 include twitter messages regarding events that occurred during the live broadcast 506-1, headlines from sports related websites 506-2, message board postings which include a hyperlink to the webpage 506-3, and social networking sites status updates 506-4. In this example all displayed relevant events 506 include a "was this relevant?" 508 feedback question. In response, the user of a client system (FIG. 1, 102) selects either yes or no. As new relevant events are received from the server system (FIG. 1, 120) older events are removed from the relevant event display area 510. The features illustrated as part of the user interface 500 are examples and can be combined, in whole or in part, in different arrangements according to other implementations.

Figure 6:
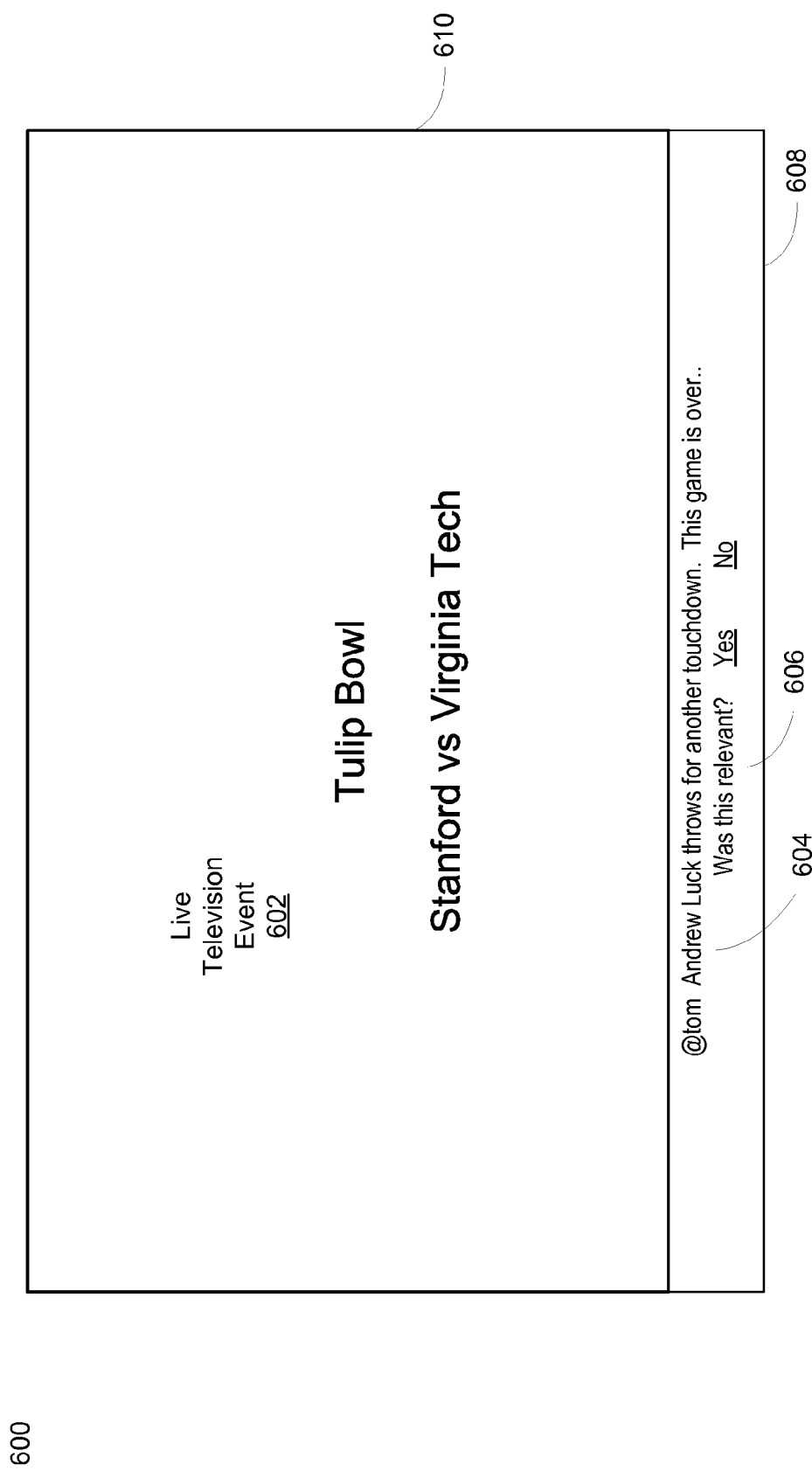
FIG. 6 depicts a user interface in accordance with some implementations.

FIG. 6 depicts a user interface in accordance with some implementations. In this example, the user interface 600 includes a broadcast display area 610 for displaying a live broadcast 602. The user interface 600 further includes a relevant event display area 608 below the broadcast display area 610 in a ticker display area. This relevant event display ticker 608 displays received relevant events to the user of the client system (FIG. 1, 102). Each event displayed includes the text of the event 604. In accordance with some implementations each relevant event is displayed as a short snippet of clickable text, which, when clicked on, sends the user further information above the clicked event. Each event also includes a user feedback mechanism 606 that allows a user of the client system (FIG. 1, 102) to indicate whether a particular event was relevant to the live broadcast 602. In this example, the live broadcast being displayed 602 is a college football game between Stanford and Virginia Tech. In this example the relevant event display 608 is displaying a twitter message 604 regarding the events occurring in the live broadcast 602. In this example the displayed relevant event 604 includes a "was this relevant?" 606 feedback question. In response, the user of a client system (FIG. 1, 102) selects either yes or no. As new relevant events are received from the server system (FIG. 1, 120) older events are removed from the relevant event display area 608.

Figure 7:
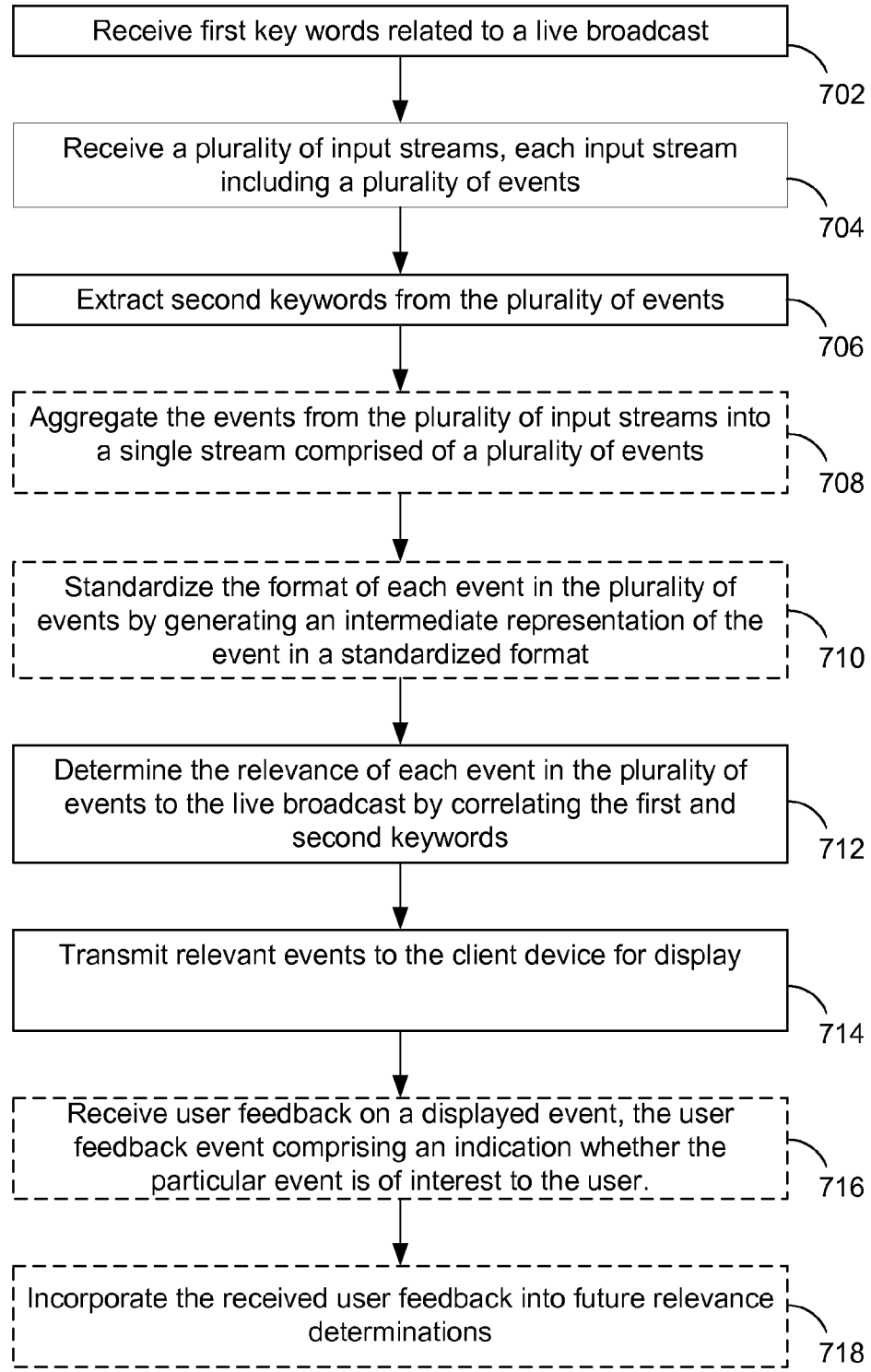
FIG. 7 is a flow diagram illustrating the process of aggregating a plurality of input streams, correlating those streams with keywords and filtering those streams based on the relevance scores in accordance with some implementations.

FIG. 7 is a flow diagram illustrating the process of aggregating a plurality of input streams, correlating those streams with keywords and filtering those streams based on the relevance scores in accordance with some implementations. Each of the operations shown in FIG. 7 may correspond to instructions stored in a computer memory or computer readable storage medium. Optional operations are indicated by dashed lines (e.g., boxes with dashed-line borders). In some implementations, the method described in FIG. 7 is performed by the server system (FIGS. 1, 120).

In accordance with some implementations, the server system (FIG. 1, 120) receives first key words related to a live broadcast (702). These keywords are obtained by retrieving information related to a live broadcast stored in the live broadcast information database (FIG. 1, 128). The information retrieved from the live broadcast database (FIG. 1, 120) includes information about the subject of the live broadcast database, the cast, the time of broadcast, and the genre of live broadcast. The server system (FIG. 1, 120) analyzes the information retrieved to extract a set of first key words related to the live broadcast. For example, if the live broadcast was an NFL game the key words extracted by the server system would include the names of the teams playing, a list of players in the game, coaches, a list of media members covering the game, and a list of football related terms.

In accordance with some implementations the server system (FIG. 1, 120) receives a plurality of input streams, each input stream including a plurality of events (704). For any given live broadcast, the server system (FIG. 1, 120) does not receive all possible information sources available over the information network (FIG. 1, 110). Instead, the input stream collection module (FIG. 1, 122) determines which input streams (FIG. 1, 112) to collect from the information network (FIG. 1, 110). This determination is made in accordance with the information sources (FIG. 1, 118) to which the user of a client system (FIG. 1, 102) is already subscribed. The server system (FIG. 1, 120) determines the streams to which a given user is subscribed by accessing the user profile stored in the user profile database (FIG. 1, 124). In some implementations the input stream collection module (FIG. 1, 122) determines the input streams to collect based on the content of the live broadcast. For example, if the live broadcast is a celebrity gossip television program such as TMZ, the input stream collection module (FIG. 1, 122) may include the RSS feeds of popular celebrity gossip websites, message boards related to celebrity issues, and the twitter feeds and social network updates of celebrities likely to be the subject of TMZ. In some implementations the producers or broadcasters of the live broadcast select the input streams (FIG. 1, 112) to be collected by the input stream collection module (FIG. 1, 122).

In accordance with some implementations the server system (FIG. 1, 120) extracts second keywords from the plurality of input streams (FIG. 1, 112), which each consist of a plurality of events. This extraction can be accomplished by analyzing an input stream to isolate a specific event. The server system then removes the metadata from the text of the event and identifies the most significant terms in the text. For example, if the received input event is a twitter message reading "Stanford goes up 17-7. I can't believe Virginia Tech didn't blitz there. Another touchdown down thrown by Luck." After all metadata is stripped away, the server system (FIG. 1, 120) may identify the terms "Stanford," "17-7," "Virginia Tech," "Blitz," "touchdown," "thrown", and "Luck" as significant terms.

In accordance with some implementations the server system (FIG. 1, 120) aggregates the events from the plurality of input streams into a single stream which includes a plurality of events (708). The input stream aggregation module (FIG. 3, 318) collects the received input streams (FIG. 1, 112) and aggregates them all into a single stream of events. The generation module (FIG. 3, 320) standardizes the events received from the plurality of streams into a common, standardized intermediate form. Standardization is explained in more detail above in the section of the specification directed towards FIG. 4B. This standardization is helpful because it allows events from many different sources to be dealt with in a consistent manner by the correlation module (FIG. 1, 130). For example, twitter messages, social network updates, news headlines, and RSS feeds can all be represented in a standardized intermediate generalization. Generating a standardized, intermediate representation of each event allows the correlation module (FIG. 1, 130) to correlate events from any information source (FIG. 1, 118) with the first set of keywords associated with the live broadcast.

In accordance with some implementations the server system (FIG. 1, 120) determines the relevance of each event in the plurality of events to the live broadcast by correlating the first and second keywords (712). The first set of keywords and the second set of keywords are used to make a correlation matrix. This correlation matrix is then used to generate a correlation score which indicates to which the first set of keywords correlates to the second set of keywords. In some implementations, the correlation is normalized to fall between −1 and 1 inclusively, wherein a higher positive normalized correlation value (closer to 1) represents more positive correlation between the second set of keywords extracted from an event in the plurality of standardized events and the first set of keywords associated with or related to the live broadcast. A more negative normalized correlation value (closer to −1) represents a more negative correlation between the second set of keywords extracted from an event in the plurality of standardized events and the first set of keywords associated with or related to the live broadcast. A lower normalized correlation value (closer to 0) represents less correlation between the second set of keywords extracted from an event in the plurality of standardized event and the first set of keywords associated with or related to the live broadcast. The determined correlation score is used as a factor in a relevance algorithm for determining a relevance score. Events that have a negative or low correlation with the keywords are determined to have a low relevance for a respective user and as a result are not transmitted by the server to a corresponding client device.

In accordance with some implementations the server system (FIG. 1, 120) transmits the relevant events to a client device for display in conjunction with the live broadcast (714). In some implementations the relevant events are transmitted via the information network (FIG. 110) to a client environment (FIG. 108). The relevant events are then displayed in the client environment. As noted above, in some implementations relevant events are displayed on the electronic device currently displaying the live broadcast. In some implementations, the relevant events are displayed in sidebar adjacent to the live broadcast. In some implementations the relevant events are displayed in a scroll bar underneath the live broadcast. The relevant events can be displayed in pop-up boxes overlaid on the live broadcast. In some implementations the relevant events are displayed on a second electronic device in the client environment (FIG. 1, 108) distinct from the electronic device on which the live broadcast is being displayed. The second electronic device may include any electronic device with a display, such as a smart phone, a tablet, a laptop, cell phone, etc.

In accordance with some implementations, the server system (FIG. 1, 120) receives user feedback for a displayed relevant event from the user of a client system. The received feedback indicates whether the displayed relevant event was considered, by the user, to be relevant to the live broadcast. In some implementations, a user feedback mechanism is displayed along with each relevant event, allowing the user to send user feedback as each event is displayed. For example, displaying a feedback question, such as "Was this event relevant?" and providing feedback buttons reading "yes" or "no." If the user selects yes, positive feedback is received by the server system (FIG. 1, 120), and if the user selects no, negative feedback is received by the server system (FIG. 1, 120).

In accordance with some implementations, the server system (FIG. 1, 120) incorporates the received user feedback into future relevance determinations. In some implementations, the received feedback is only used in future relevance determinations for the user who submitted the feedback. In some implementations, the received feedback is used in future relevance determinations for users other than the user who submitted the feedback regarding relevance. If the feedback received from user indicates that the displayed events are insufficiently relevant to the live broadcast, the event will be removed from display. In some implementations, the feedback received from user will be used to adjust the filter threshold (FIG. 4A, 414).

Figure 8:
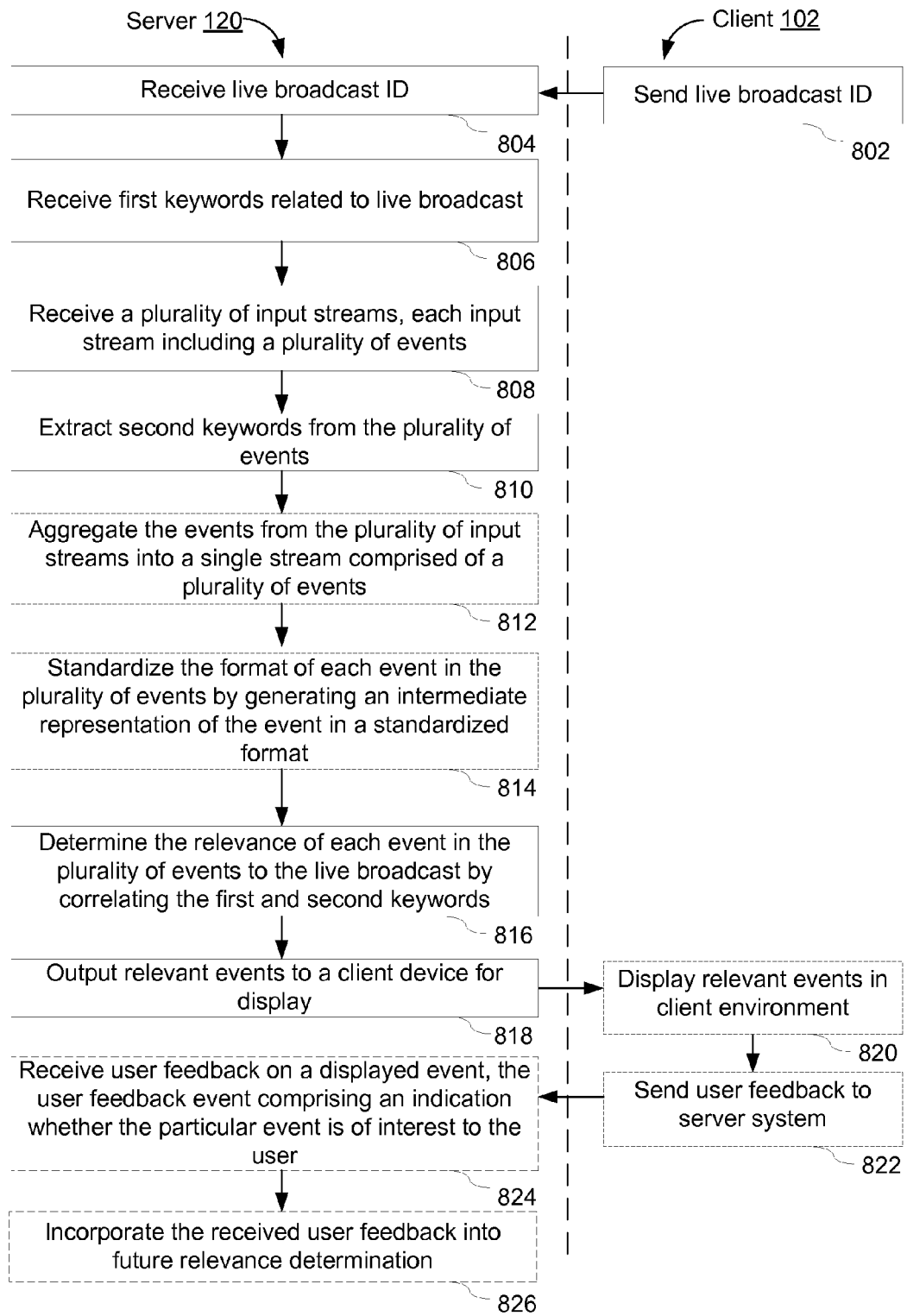
FIG. 8 is a flow diagram illustrating the communication between a client and a server system in accordance with some implementations.

FIG. 8 is a flow diagram illustrating the communication between a client (FIG. 1, 102) and a server system (FIG. 1, 120) in accordance with some implementations. Each of the operations shown in FIG. 8 may correspond to instructions stored in a computer memory or computer readable storage medium. Optional operations are indicated by dashed lines (e.g., boxes with dashed-line borders).

In accordance with some implementations, the client system (FIG. 1, 102) sends the ID of live broadcast currently being displayed in the client environment (FIG. 1, 108) to the server system (FIG. 1, 120) (802). The client system can determine the ID of the live broadcast by several different methods. If the client system itself is displaying the live broadcast, the client system can analyze the live broadcast data stream to determine the specific live broadcast being displayed. Alternatively, the user of the client system may enter identification data for the live broadcast they are currently watching. The server system (FIG. 1, 120) receives the live broadcast ID from the client system (FIG. 1, 102). The server system (FIG. 1, 120) receives first keywords related to the live broadcast from the live broadcast information database (FIG. 1, 128). These keywords include a list of terms related to the broadcast. In some implementations, the keywords received from the live broadcast information database (FIG. 1, 128) are determined before the live broadcast and do not change during the broadcast. In some implementations, the list of keywords is supplemented and updated as the live broadcast is broadcast, to include additional terms relevant to recent developments in the live broadcast. For example, if the live broadcast is a college football game and a player had been injured, keywords related to the injury are added to the list of related keywords used by the server system (FIG. 1, 120).)

In some implementations, the server system (FIG. 1, 120) receives a plurality of input streams, each input stream including a plurality of events (808). The server system (FIG. 1, 120) extracts second keywords from the plurality of events included in each input stream (810). The server system (FIG. 1, 120) aggregates the events from the plurality of input streams into a single stream which includes a plurality of events (812). The server system (FIG. 1, 120) standardizes the format of each event in the plurality of events by generating an intermediate representation of the event format in a standardized format (814). The standardized format is described in more detail above with respect to FIG. 4B.

In some implementations, the server system (FIG. 1, 120) determines the relevance of each event in the plurality of events by correlating the first and second keywords and generating a relevance score based on the correlation between two sets of keywords (816). Correlating the first and second keywords includes using a correlation matrix to generate a correlation score which represents the degree to which the two sets of keywords are correlated. The server system (FIG. 1, 120) outputs relevant events for display in conjunction with the live broadcast (818). Relevant events include at least a subset of events with relevance scores above a predetermined threshold value. In some implementations all events with relevance scores above the threshold are output as relevant events. In some implementations, the server system (FIG. 1, 120) uses a random or pseudorandom algorithm to select a subset of all relevant events to send to the client system (FIG. 1, 102). In some implementations the server system (FIG. 1, 120) selects a subset of all events with a relevance score that exceeds the threshold in accordance with the information stored in the user profile. In some implementations the server system (FIG. 1, 120) intentionally filters out events which are similar to already displayed relevant events to ensure greater diversity in displayed relevant events. The server system (FIG. 1, 120) uses the information network (FIG. 1, 110) to send the relevant events to the client system (FIG. 1, 102).

In accordance with some implementations, the client system (FIG. 1, 102) displays the relevant events received from the server system (FIG. 1, 120) (820). The user of the client system (FIG. 1, 102) indicates whether a given displayed event was sufficiently relevant to be displayed. The client system (FIG. 1, 102) sends the user feedback to the server system (FIG. 1, 120) (822). The server system (FIG. 1, 120) receives the user feedback on a displayed event, the user feedback event comprising an indication from the user whether the particular event is relevant to the live broadcast (824). The server system (FIG. 1, 120) incorporates the user feedback into future relevance determinations (826).

It should be noted that while the foregoing description is primarily directed to live broadcasts, the above embodiments are not limited solely to live broadcasts. The above embodiments may be used in connection with any broadcasted media, including pre-taped television content and any other non-live broadcast media.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain the principles of the invention and its practical applications, to thereby enable others skilled in the art to best utilize the invention and various implementations with various modifications as are suited to the particular use contemplated.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present implementations. The first contact and the second contact are both contacts, but they are not the same contact.

The terminology used in the description of the implementations herein is for the purpose of describing particular implementations only and is not intended to be limiting. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if (a stated condition or event) is detected" may be construed to mean "upon determining" or "in response to determining" or "upon detecting (the stated condition or event)" or "in response to detecting (the stated condition or event)," depending on the context.

What is claimed:

1. A method for supplementing a live broadcast being displayed to a first person, comprising:
   on a computing device having one or more processors and memory storing one or more programs for execution by the one or more processors to perform the method:
   receiving program identification information for the live broadcast that is displayed to the first person at a client device distinct from the computing device;
   identifying the live broadcast from the received program identification information;
   in response to the receiving, analyzing descriptive information for the live broadcast and generating therefrom first keywords related to the live broadcast displayed at the client device distinct from the computing device, the first keywords being usable for determining relevance to the live broadcast of events entered manually during the live broadcast;
   receiving a plurality of live information streams independent from the live broadcast, each live information stream including a plurality of events corresponding to information entered manually during the live broadcast;
   automatically without user intervention:
      extracting second keywords from the plurality of events;
      determining the relevance of each event in the plurality of events to the live broadcast by correlating the first keywords generated from the descriptive information of the live broadcast and the second keywords extracted from the plurality of events;
      selecting events that have a relevance greater than a relevance threshold; and
      formatting for display information representing the events with a relevance greater than a relevance threshold to the first person.

2. The method of claim 1, further comprising:
   receiving user feedback on a displayed event, the user feedback for a particular event including an indication by the first person whether the particular event is relevant to the live broadcast.

3. The method of claim 2, further comprising:
   incorporating the feedback received from the first person in future relevance determinations.

4. The method of claim 1, further comprising:
   aggregating the plurality of events from the plurality of live information streams into a single stream including a plurality of events; and
   standardizing the format of each event in the aggregated events by generating an intermediate representation of the event in a standardized format.

5. The method of claim 4, wherein the standardized intermediate representation includes a stream of keywords associated with the event.

6. The method of claim 1, wherein the first person is a first viewer of the live broadcast, and a second person enters the information manually during the live broadcast and is a second viewer of the live broadcast.

7. The method of claim 1, wherein the descriptive information related to the live broadcast is retrieved from a broadcast schedule, a database or metadata included with the live broadcast.

8. The method of claim 1, wherein the plurality of live information streams includes websites, RSS feeds, twitter feeds, internet message board postings, video stream sites, social network updates or notifications and any other social media streams.

9. The method of claim 1, wherein the plurality of live information streams includes dynamic information transmitted in conjunction with the live broadcast.

10. The method of claim 1, wherein the plurality of live information streams include input streams to which the first person is already subscribed, further comprising:
    accessing a user profile with the first person; and
    determining the information streams to which the first person is already subscribed according to the user profile.

11. The method of claim 1, wherein the plurality of live information streams include live information streams related to the live broadcast.

12. The method of claim 1, wherein the plurality of live information streams include live information streams selected by a broadcaster or producer of the live broadcast.

13. The method of claim 1, wherein determining relevance of the events to the live broadcast includes using a support vector machine to construct a hyper-plane which distinguishes relevant events from non-relevant events.

14. The method of claim 1, wherein determining relevance of the events includes filtering events by applying a relevance threshold to each event in the plurality of events.

15. The method of claim 1, wherein the transmitting the relevant events includes displaying the relevant events on the computing device already displaying the live broadcast.

16. The method of claim 1, wherein relevant events are displayed a client system the computing device already displaying the live broadcast as an overlay on the live broadcast.

17. The method of claim 1, wherein relevant events are displayed on the computing device already displaying the live broadcast as a ticker running alongside the live broadcast.

18. The method of claim 1, wherein the transmitting the relevant events further includes displaying relevant events on a device distinct from the device displaying the live broadcast.

19. A system for supplementing a live broadcast, comprising:
one or more processors; and
memory storing one or more programs to be executed by the one or more processors;
the one or more programs comprising instructions for:
receiving program identification information for the live broadcast that is displayed to a first person at a client device distinct from the system;
identifying the live broadcast from the received program identification information;
in response to the receiving, analyzing descriptive information for the live broadcast and generating therefrom first keywords related to the live broadcast displayed at the client device distinct from the system, the first keywords being usable for determining relevance to the live broadcast of events entered manually during the live broadcast;
receiving a plurality of live information streams independent from the live broadcast, each live information stream including a plurality of events corresponding to information entered manually during the live broadcast;
automatically without user intervention:
extracting second keywords from the plurality of events;
determining the relevance of each event in the plurality of events to the live broadcast by correlating the first keywords generated from the descriptive information of the live broadcast and the second keywords extracted from the plurality of events;
selecting events that have a relevance greater than a relevance threshold; and
formatting for display information representing the events with a relevance greater than a relevance threshold to the first person.

20. A non-transitory computer readable storage medium storing one or more programs, the one or more programs comprising instructions, which when executed by a computing device cause the computing device to implement operations including:
receiving program identification information for the live broadcast that is displayed to the first person at a client device distinct from the computing device;
identifying the live broadcast from the received program identification information;
in response to the receiving, analyzing descriptive information for the live broadcast and generating therefrom first keywords related to the live broadcast displayed at the client device distinct from the computing device, the first keywords being usable for determining relevance to the live broadcast of events entered manually during the live broadcast;
receiving a plurality of live information streams independent from the live broadcast, each live information stream including a plurality of events corresponding to information entered manually during the live broadcast;
automatically without user intervention:
extracting second keywords from the plurality of events;
determining the relevance of each event in the plurality of events to the live broadcast by correlating the first keywords generated from the descriptive information of the live broadcast and the second keywords extracted from the plurality of events;
selecting events that have a relevance greater than a relevance threshold; and
formatting for display information representing the events with a relevance greater than a relevance threshold to the first person.

\* \* \* \* \*